United States Patent
Kojima et al.

(10) Patent No.: US 12,246,866 B2
(45) Date of Patent: Mar. 11, 2025

(54) DRONE PORT

(71) Applicant: MITSUBISHI HEAVY INDUSTRIES, LTD., Tokyo (JP)

(72) Inventors: Toru Kojima, Tokyo (JP); Satoshi Mori, Tokyo (JP); Shinya Kunii, Aichi (JP); Shinichi Maki, Aichi (JP); Katsumi Takagi, Tokyo (JP); Tetsuya Nagasawa, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/037,686

(22) PCT Filed: Jan. 20, 2022

(86) PCT No.: PCT/IB2022/050451
§ 371 (c)(1),
(2) Date: May 18, 2023

(87) PCT Pub. No.: WO2022/107114
PCT Pub. Date: May 27, 2022

(65) Prior Publication Data
US 2024/0017859 A1   Jan. 18, 2024

(30) Foreign Application Priority Data
Nov. 20, 2020   (JP) .................. 2020-193602

(51) Int. Cl.
*B64U 70/93*   (2023.01)
*B64U 10/17*   (2023.01)
(Continued)

(52) U.S. Cl.
CPC ............. *B64U 70/99* (2023.01); *B64U 10/17* (2023.01); *B64U 70/00* (2023.01); *B64U 70/93* (2023.01); *B64U 70/95* (2023.01); *B64U 2101/30* (2023.01)

(58) Field of Classification Search
CPC ......... B64U 70/99; B64U 70/95; B64U 70/93
See application file for complete search history.

(56) References Cited

U.S. PATENT DOCUMENTS

| | | | |
|---|---|---|---|
| 11,873,100 B2 | 1/2024 | Wake et al. | |
| 2020/0239160 A1 | 7/2020 | Cheng et al. | |
| 2022/0024588 A1 | 1/2022 | Wake et al. | |

FOREIGN PATENT DOCUMENTS

| | | |
|---|---|---|
| CN | 108248884 | 7/2018 |
| CN | 108357689 | 8/2018 |

(Continued)

OTHER PUBLICATIONS

Extended European Search Report issued Feb. 7, 2024 in corresponding European Patent Application No. 22724397.9.

(Continued)

*Primary Examiner* — Tye William Abell
(74) *Attorney, Agent, or Firm* — Wenderoth, Lind & Ponack, L.L.P.

(57) ABSTRACT

A drone port is portable to be disposed on a landing surface for a drone and includes a covering section configured to cover the landing surface and provided with markers of different sizes. The covering section includes a restraining section configured to restrain the drone on the covering section. The restraining section includes a first hook-and-loop fastener disposed on the covering section. The first hook-and-loop fastener is configured to join with a second hook-and-loop fastener configured to be disposed on the drone.

13 Claims, 5 Drawing Sheets

(51) Int. Cl.
*B64U 70/00* (2023.01)
*B64U 70/95* (2023.01)
*B64U 70/99* (2023.01)
*B64U 101/30* (2023.01)

(56) References Cited

FOREIGN PATENT DOCUMENTS

| | | | |
|---|---|---|---|
| IT | 202019000002466 | | 10/2019 |
| JP | 2018-188017 | | 11/2018 |
| JP | 2020-117118 | | 8/2020 |
| JP | 2020117118 A | * | 8/2020 |
| JP | 2020-186523 | | 11/2020 |
| KR | 10-2015-0057619 | | 5/2015 |
| KR | 20200079017 A | * | 12/2018 |
| KR | 10-2020-0079017 | | 7/2020 |
| WO | 2020/116443 | | 6/2020 |
| WO | 2021/014311 | | 1/2021 |

OTHER PUBLICATIONS

International Search Report issued Mar. 22, 2022 in corresponding International (PCT) Patent Application No. PCT/IB2022/050451, with English translation.
Written Opinion issued Mar. 22, 2022 in corresponding International (PCT) Patent Application No. PCT/IB2022/050451, with English translation.

* cited by examiner

DRONE PORT

FIELD

The present disclosure relates to a drone port that is portable and on which a drone lands.

BACKGROUND

A portable drone port has conventionally been known that enables a drone for logistics to take off and land on an undulating site (see, for example, Japanese Patent Application Publication No. 2020-117118). The portable drone port includes a takeoff/landing port capable of retaining a horizontal plane, a fence surrounding the outer side of the takeoff/landing port, and a marker sheet fixed to the fence and expanded horizontally.

SUMMARY

Technical Problem

When a drone lands on a drone port, an external factor, such as a wind gust, may overturn the drone. In particular, when a drone port is installed on a vessel, the vessel rolls or pitches because of a wave or the like, so that a drone is easily overturned. Furthermore, when a drone port is installed on a moving object, such as a vessel, a relative speed difference occurs between the drone port and a drone, so that the drone is easily overturned.

Thus, an object of the present disclosure is to provide a drone port that can prevent overturning of a drone in landing.

Solution to Problem

A drone port according to the present disclosure is portable to be disposed on a landing surface for a drone, and includes: a covering section that covers the landing surface and provided with markers of different sizes, the covering section including a restraining section that restrains, on the covering section, the drone that lands on the covering section.

Advantageous Effects of Invention

According to the present disclosure, overturning of a drone in landing can be prevented.

DESCRIPTION OF EMBODIMENTS

Embodiments of the present disclosure will be described in detail below with reference to the drawings. Note that these embodiments do not limit this invention. Furthermore, constituents in the following embodiments include constituents that can be readily substituted by those skilled in the art or that are substantially the same. Moreover, constituents described below can be combined as appropriate, and, when there are a plurality of embodiments, the embodiments can also be combined.

First Embodiment

A drone port 1 of a first embodiment is a portable port installed on a landing surface on which a drone 4 lands. The drone 4 of the first embodiment is an unmanned aircraft and includes a vertical takeoff and landing aircraft, such as a helicopter. In the first embodiment, an unmanned helicopter is exemplified as the drone 4 in the description; however, limitation to a helicopter is not particularly intended, and any drone 4 may be used as long as the drone 4 is an unmanned aircraft.

Drone Port

Figure 1:
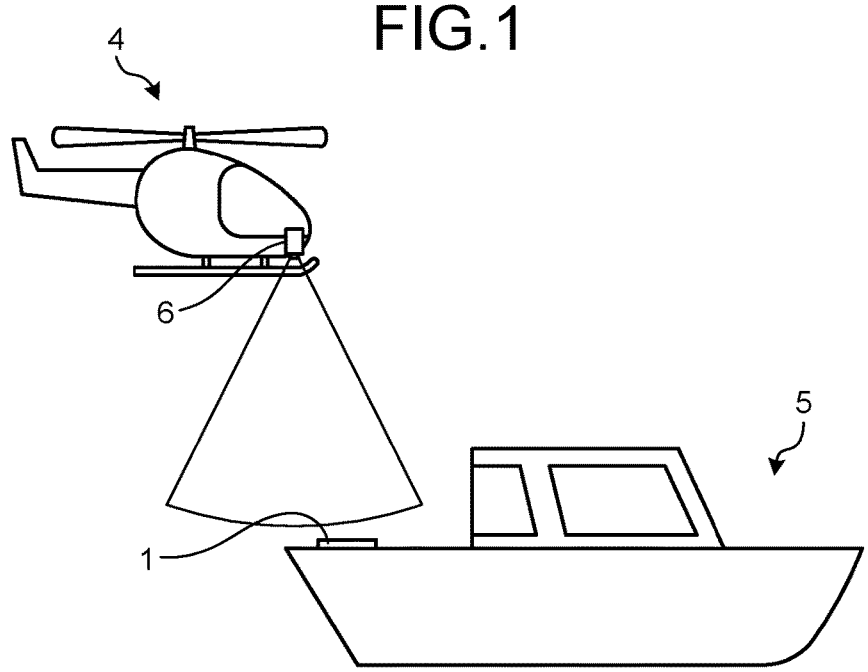
FIG. 1 is a schematic configuration diagram illustrating example installation of a drone port according to a first embodiment.
Figure 2:
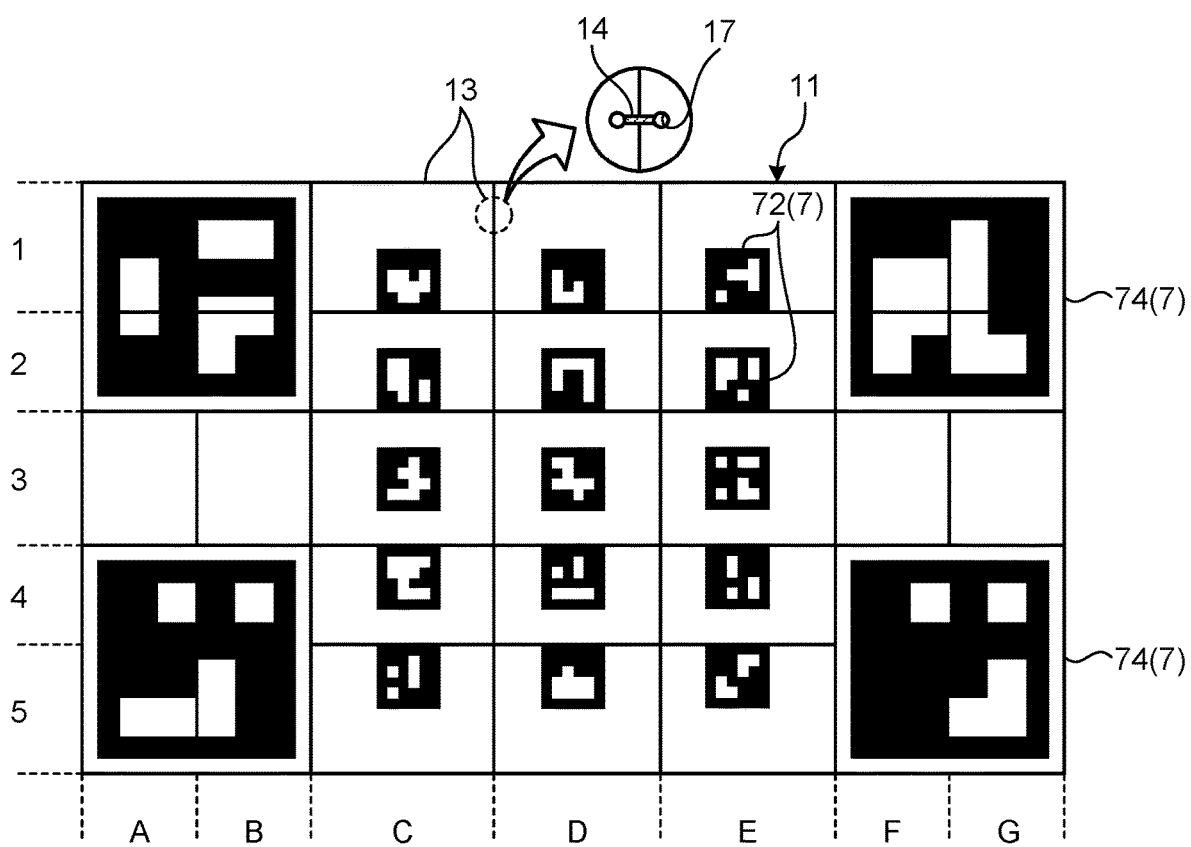
FIG. 2 is a plan view schematically illustrating the drone port according to the first embodiment.
Figure 3:
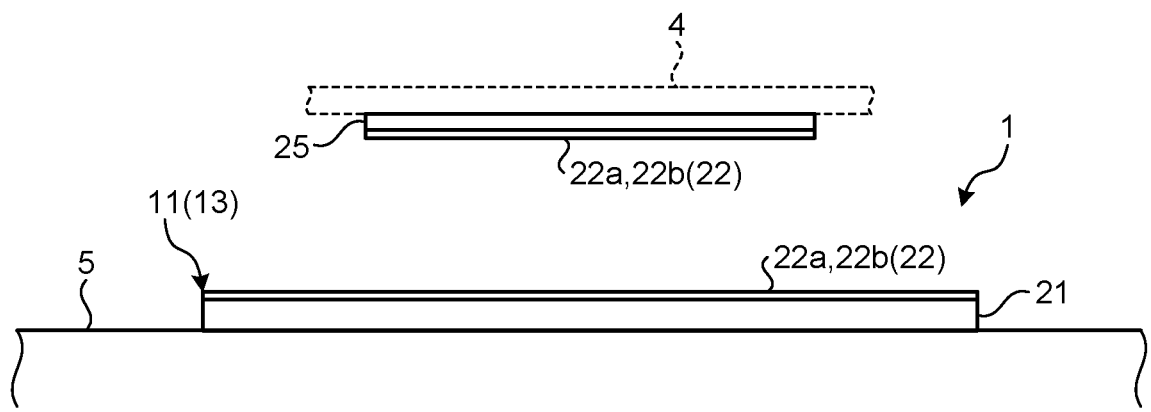
FIG. 3 is a side view schematically illustrating the drone port according to the first embodiment.

FIG. 1 is a schematic configuration diagram illustrating example installation of the drone port according to the first embodiment. FIG. 2 is a plan view schematically illustrating the drone port according to the first embodiment. FIG. 3 is a side view schematically illustrating the drone port according to the first embodiment. As illustrated in FIG. 1, the drone port 1 is installed on a vessel 5 as a moving object moving on the water. Thus, the drone 4 lands on the vessel 5 that moves relative to the drone 4. Note that, in the first embodiment, the drone port 1 is disposed on the vessel 5; however, limitation to the vessel 5 is not particularly intended, and the drone port 1 may be disposed on a vehicle or the like as a moving object moving on the ground or may be disposed on a non-moving facility or on the ground.

As illustrated in FIGS. 2 and 3, the drone port 1 includes a port body (covering section) 11 covering the landing surface. The port body 11 is provided with a plurality of markers 7 of different sizes. In the first embodiment, each marker 7 is, for example, an AR marker color-coded with two colors, black and white, and is a square marker. This marker 7 serves as an indicator for allowing the drone 4 to land on a predetermined landing position of the drone port 1. A camera 6 disposed on the drone 4 images the marker 7, and image processing is performed, whereby the landing position is captured. Note that the marker 7 is not limited to an AR marker and may be any marker enabling capturing of the landing position through image processing.

The markers 7 include a plurality of small markers 72 and a plurality of large markers 74. The small markers 72 are disposed in a central portion of the port body 11 and are arranged next to each other such that their center positions are mutually different. The small markers 72 are arranged in a matrix and are arranged, for example, in five rows and three columns as illustrated in FIG. 2. Note that FIG. 2 exemplifies the small markers 72 arranged in five rows and three columns; however, the number of the rows and the number of the columns are not particularly limited. Furthermore, the small markers 72 are not necessarily arranged in a matrix and may be arranged in a scattered manner. That is, the distances between adjacent small markers 72 are not necessarily equal.

The large markers 74 are disposed in a peripheral portion of the port body 11 and are arranged so as to surround the small markers 72. The large markers 74 are larger in size than the small markers 72. The large markers 74 are arranged such that their center positions are mutually different and are arranged so that their center positions are different from those of the small markers 72. The large markers 74 are arranged in a matrix and are arranged, for example, in two rows and two columns as illustrated in FIG. 2. Note that FIG. 2 exemplifies the large markers 74 arranged in two rows and two columns; however, the number of the rows and the number of the columns are not particularly limited. Furthermore, the large markers 74 are not necessarily arranged in a matrix and may be arranged in a scattered manner. That is, the distances between adjacent large markers 74 are not necessarily equal.

The port body 11 provided with the small markers 72 and the large markers 74 includes a plurality of port pieces (covering pieces) 13 and a coupling member 14 coupling the port pieces 13. The port pieces 13 are shaped into rectangles. The port pieces 13 are arranged in a matrix and are arranged, for example, in five rows and seven columns as illustrated in FIG. 2. The port pieces 13 have different sizes in FIG. 2 but may have the same size, and no limitation is particularly intended. The port pieces 13 are arranged in a matrix to form the small markers 72 and the large markers 74.

Each small marker 72 is formed on a single port piece 13. Thus, each small marker 72 is not divided, which prevents recognition of the marker 7 by the camera 6 from being affected. On the other hand, each large marker 74 is formed by a plurality of the port pieces 13. Thus, each large marker 74 enhances portability. Note that, in the first embodiment, each large marker 74 is formed by four port pieces 13.

Since the port pieces 13 are arranged in a matrix to form the small markers 72 and the large markers 74, arrangement numbers for properly forming the small markers 72 and the large markers 74 are assigned to the port pieces 13. As the arrangement numbers, as illustrated in FIG. 2, matrix notation is used. That is, the numbers from 1 to 5 are assigned as rows, and the letters from A to G are assigned as columns. Thus, as the arrangement numbers, for example, "1A" is assigned to the upper left port piece 13, and "5G" is assigned to the lower right port piece 13.

As the coupling member 14, for example, a cable tie is used. The coupling member 14 is inserted into a through hole 17 formed in the port piece 13. The coupling member 14 is inserted into the through holes 17 of adjacent port pieces 13 and is tied to couple the adjacent port pieces 13 to each other. Note that a cable tie is applied as the coupling member 14 in the description; however, any member may be used as long as the member can couple the port pieces 13 to each other. Furthermore, the through hole 17 has a size that does not affect image processing by the camera 6 and is formed, avoiding the marker 7.

Furthermore, as illustrated in FIG. 3, the port body 11 (port pieces 13) includes a flat plate 21 and a hook-and-loop fastener 22 as a restraining section.

As the flat plate 21, for example, a rigid plate material, such as an acrylic plate or a polyvinyl chloride plate, is used. The flat plate 21 prevents flapping of the port body 11 due to downwash by the drone 4 in landing. Thus, the flat plate 21 has a weight and rigidity capable of preventing flapping of the port body 11.

The hook-and-loop fastener 22 restrains, on the port body 11, the drone 4 that lands on the port body 11. The hook-and-loop fastener 22 preferably has water resistance, weather resistance, and antifouling property. The hook-and-loop fastener 22 are composed of, for example, a hook-and-loop fastener 22a on the hook side and a hook-and-loop fastener 22b on the loop side. In the hook-and-loop fastener 22, the hook-and-loop fastener 22a or 22b on one side is disposed on the port body 11, and the hook-and-loop fastener 22a or 22b on the other side is disposed on the drone 4.

The hook-and-loop fastener 22a or 22b on the one side is disposed over the entire surface on the upper side of the port body 11. Thus, the small markers 72 and the large markers 74 formed on the port body 11 are formed by the hook-and-loop fastener 22a or 22b on the one side. The hook-and-loop fastener 22a or 22b on the one side is disposed over the entire surface on the upper side of the port body 11, so that, regardless of which landing position of the port body 11 the drone 4 lands on, the drone 4 can be restrained on the port body 11. Furthermore, the hook-and-loop fastener 22a or 22b on the one side is joined to the top surface of the flat plate 21 through adhesive. The top surface of the flat plate 21 is a flat surface, so that the hook-and-loop fastener 22a or 22b on the one side has a top surface being a flat surface.

The hook-and-loop fastener 22a or 22b on the other side is disposed on a contact surface, coming into contact with the drone port 1, of a leg section of the drone 4. In specific, the leg section of the drone 4 is provided with a receiving plate 25 on which the hook-and-loop fastener 22a or 22b on the other side is disposed. The receiving plate 25 has a bottom surface (contact surface) on the lower side being a flat surface. The hook-and-loop fastener 22a or 22b on the other side is joined to the bottom surface of the receiving plate 25 through adhesive. The bottom surface of the receiving plate 25 is a flat surface, so that the hook-and-loop fastener 22a or 22b on the other side has an undersurface being a flat surface. Note that the contact surface of the drone 4 is not particularly limited to a flat surface.

In the hook-and-loop fastener 22, the top surface of the hook-and-loop fastener 22a or 22b on the one side and the undersurface of the hook-and-loop fastener 22a or 22b on the other side are flat surfaces. Thus, when the drone 4 is landing, the hook-and-loop fasteners 22 are joined through surface contact, so that the drone 4 is attached to the port body 11 through surface attachment.

In the above-described drone port 1, the drone 4 is landing on a predetermined landing position of the port body 11 using the markers 7 disposed on the port body 11 as indicators in landing. When the drone 4 lands on the port body 11, the hook-and-loop fasteners 22a and 22b are joined to each other through surface attachment. Thus, the drone 4 is restrained on the port body 11.

If the aerodynamic lift as to pull the hook-and-loop fasteners 22a and 22b apart from each other can be produced in takeoff, the drone 4 takes off from the port body 11. On the other hand, if it is difficult to pull the hook-and-loop fasteners 22a and 22b apart from each other in takeoff, the hook-and-loop fasteners 22a and 22b are pulled apart from each other to detach the drone 4 from the port body 11 after the drone 4 lands on, and the drone 4 is restrained with a restraining device separately disposed on the vessel 5. In takeoff, the drone 4 is released from the restraint made by the restraining device and takes off.

Note that, in the first embodiment, the hook-and-loop fastener 22 is applied as the restraining section restraining the drone 4 on the port body 11; however, instead of the hook-and-loop fastener 22, a mechanism using an electromagnet may be applied. For example, instead of the hook-and-loop fastener 22a or 22b on the one side disposed on the port body 11, a magnetic material having magnetism, such as a steel plate, is disposed, and instead of the hook-and-loop fastener 22a or 22b on the other side disposed on the drone 4, an electromagnet is disposed. When the drone 4 is landing, the electromagnet is energized to magnetize the magnetic material on the port body 11. On the other hand, when the drone 4 takes off, the magnetization of the electromagnet is demagnetized to allow the drone 4 to take off.

Second Embodiment

Figure 4:
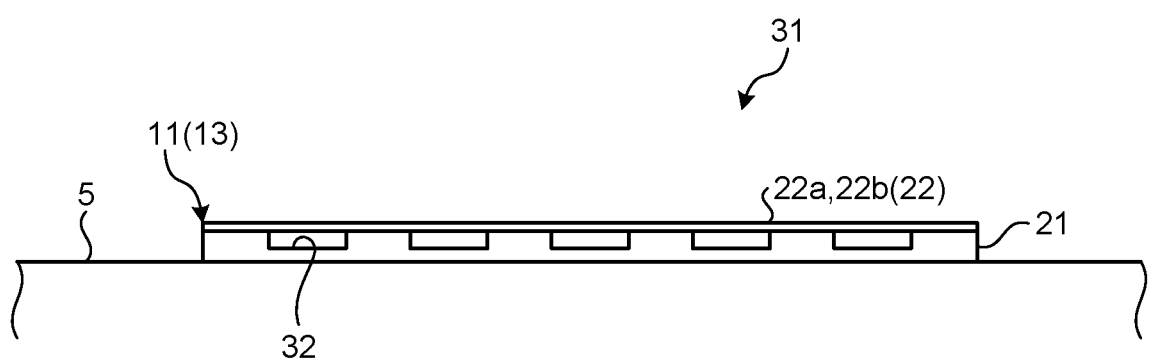
FIG. 4 is a side view schematically illustrating a drone port according to a second embodiment.

Next, a drone port 31 of a second embodiment will be described with reference to FIG. 4. Note that, in the second embodiment, parts different from the first embodiment are described to avoid overlapping description, and constituents similar to those of the first embodiment are denoted by the same reference signs in the description. FIG. 4 is a side view schematically illustrating the drone port according to the second embodiment.

Drone Port

As illustrated in FIG. 4, in the drone port 31 of the second embodiment, grooves 32 serving as drainage channels are formed in the flat plate 21. If water, such as rain and sea water, falls on the drone port 31, the grooves 32 drain the falling water out of the drone port 31.

Third Embodiment

Figure 5:
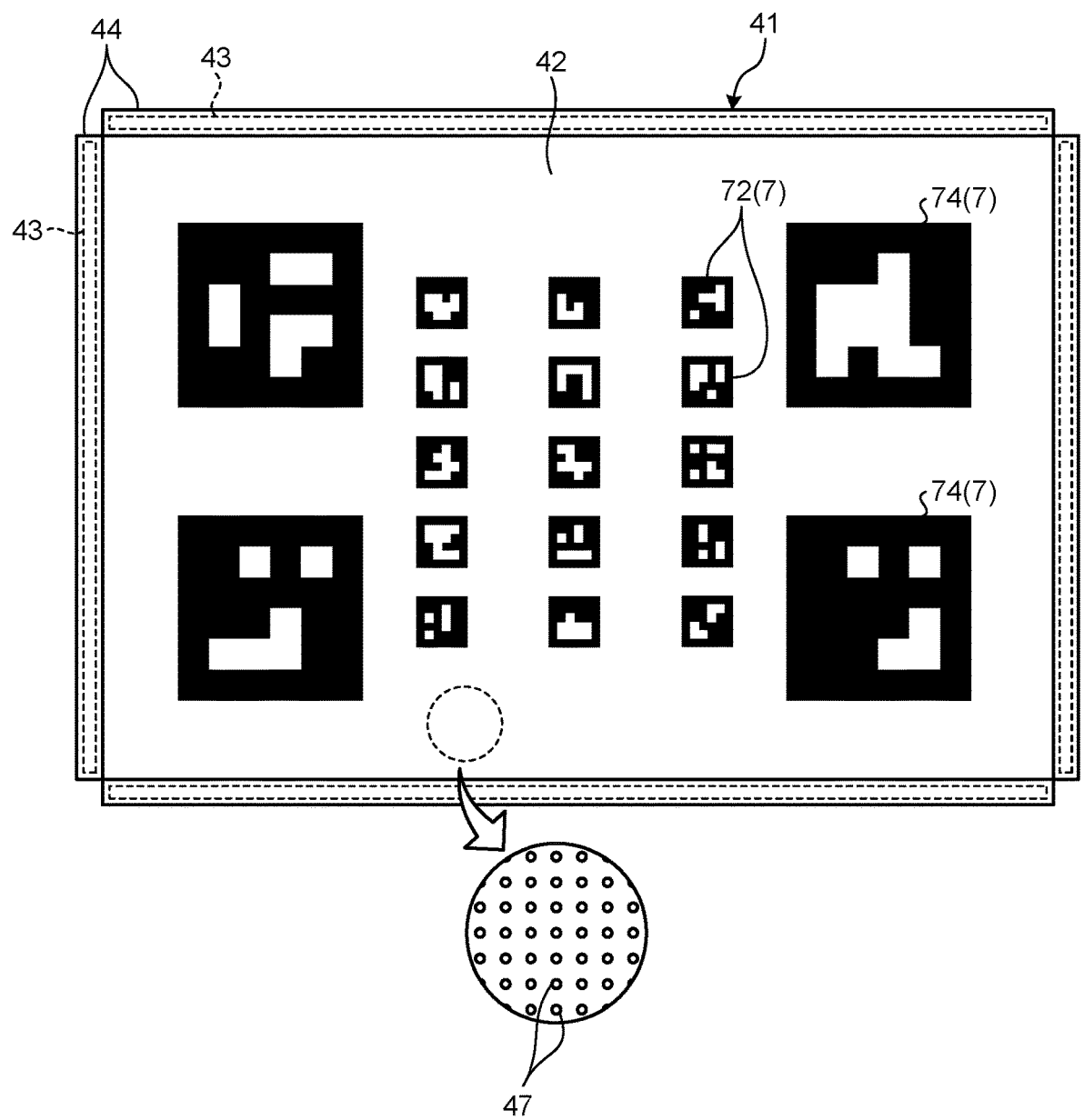
FIG. 5 is a plan view schematically illustrating a drone port according to a third embodiment.
Figure 6:
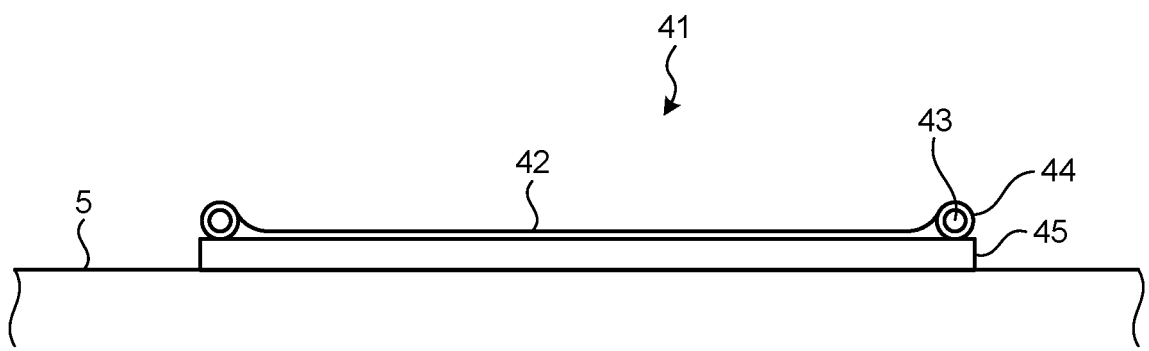
FIG. 6 is a side view schematically illustrating the drone port according to the third embodiment.

Next, a drone port 41 of a third embodiment will be described with reference to FIGS. 5 and 6. Note that, in the third embodiment, parts different from the first and second embodiments are described to avoid overlapping description, and constituents similar to those of the first and second embodiments are denoted by the same reference signs in the description. FIG. 5 is a plan view schematically illustrating the drone port according to the third embodiment. FIG. 6 is a side view schematically illustrating the drone port according to the third embodiment.

Drone Port

As illustrated in FIGS. 5 and 6, the drone port 41 includes a port sheet 42 covering the landing surface, numerous through holes 47 formed in the port sheet 42, weights 43, accommodating sections 44, and a buffer sheet 45.

Similar to the first embodiment, the port sheet 42 is provided with a plurality of markers 7 of different sizes. Note that the markers 7 are similar to those of the first embodiment, the configuration in the third embodiment is provided by reading the port body 11 of the first embodiment as the port sheet 42 of the third embodiment, and the description is thus omitted.

The port sheet 42 is formed into a sheet covering the landing surface and is shaped into a rectangle. As the port sheet 42, tarpaulin having waterproofness is used. The markers 7 are printed on the port sheet 42. The numerous through holes 47 are formed through the port sheet 42. The numerous through holes 47 have the same size and are regularly arranged in the port sheet 42. That is, the numerous through holes 47 are also formed in the markers 7 printed on the port sheet 42. Thus, the through holes 47 have a size that does not affect image processing on the markers 7 by the camera 6. The numerous through holes 47 are arranged, for example, in a matrix.

The accommodating sections 44 are disposed on the respective four sides on the periphery of the rectangular port sheet 42. The accommodating sections 44 are cylindrical bags accommodating the weights 43. The accommodating sections 44 accommodate the weights 43 in a removable manner. The accommodating sections 44 are disposed, extending along the sides. The weights 43 are, for example, iron rods formed into bars and are accommodated in the accommodating sections 44. Thus, when the drone port 41 is used, the weights 43 are accommodated in the accommodating sections 44, while, when the drone port 41 is not used, the weights 43 are removed from the accommodating sections 44. Thus, the drone port 41 from which the weights 43 are removed can be folded to be compact in size.

The numerous through holes 47 and the weights 43 prevent flapping of the port sheet 42 due to downwash by the drone 4 in landing. Thus, the weights 43 have a weight capable of preventing flapping of the port sheet 42.

As illustrated in FIG. 6, the buffer sheet 45 is disposed between the port sheet 42 and the landing surface and absorbs impact caused by landing of the drone 4. The buffer sheet 45 is formed of a buffer material, such as rubber, into a sheet. The buffer sheet 45 is covered by the port sheet 42. Thus, the port sheet 42 is in a free state relative to the buffer sheet 45.

In the above-described drone port 41, the drone 4 lands on a predetermined landing position of the port sheet 42 using the markers 7 disposed on the port sheet 42 as indicators in landing. Even if downwash occurs when the drone 4 is landing, the port sheet 42 allows airflow to circulate through the numerous through holes 47 formed in the port sheet 42, which prevents flapping of the port sheet 42. Furthermore, the periphery of the port sheet 42 is held down by the weights 43, so that, even if downwash occurs when the drone 4 is landing, flapping of the port sheet 42 is prevented.

In takeoff, the drone 4 takes off from the port sheet 42. Note that the drone 4 may be detached from the port sheet 42 after landing and be restrained with a restraining device separately disposed on the vessel 5. In takeoff, the drone 4 may be released from the restraint made by the restraining device and take off.

Fourth Embodiment

Figure 7:
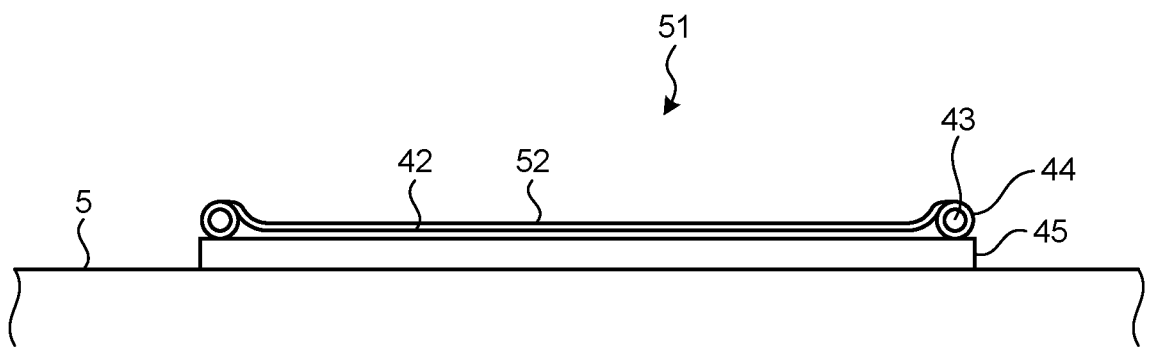
FIG. 7 is a side view schematically illustrating a drone port according to a fourth embodiment.

Next, a drone port 51 of a fourth embodiment will be described with reference to FIG. 7. Note that, in the fourth embodiment, parts different from the first to third embodiments are described to avoid overlapping description, and constituents similar to those of the first to third embodiments are denoted by the same reference signs in the description. FIG. 7 is a side view schematically illustrating the drone port according to the fourth embodiment.

Drone Port

As illustrated in FIG. 7, the drone port 51 of the fourth embodiment is provided with a hook-and-loop fastener 52 on the port sheet 42 of the third embodiment. The hook-and-loop fastener 52 is similar to the hook-and-loop fastener 22a or 22b on the one side of the hook-and-loop fastener 22 of the first embodiment. Thus, similar to the first embodiment, the hook-and-loop fastener 22a or 22b on the other side is provided to the drone 4. When the drone 4 is landing, the hook-and-loop fastener 52 is joined through surface contact with the hook-and-loop fastener 22a or 22b on the other side disposed on the drone 4, so that the drone 4 is restrained on the port sheet 42 through surface attachment. Note that to prevent the hook-and-loop fastener 52 from blocking the numerous through holes 47 formed in the port sheet 42, numerous through holes corresponding to the numerous through holes 47 of the port sheet 42 are formed in the hook-and-loop fastener 52.

Fifth Embodiment

Figure 8:
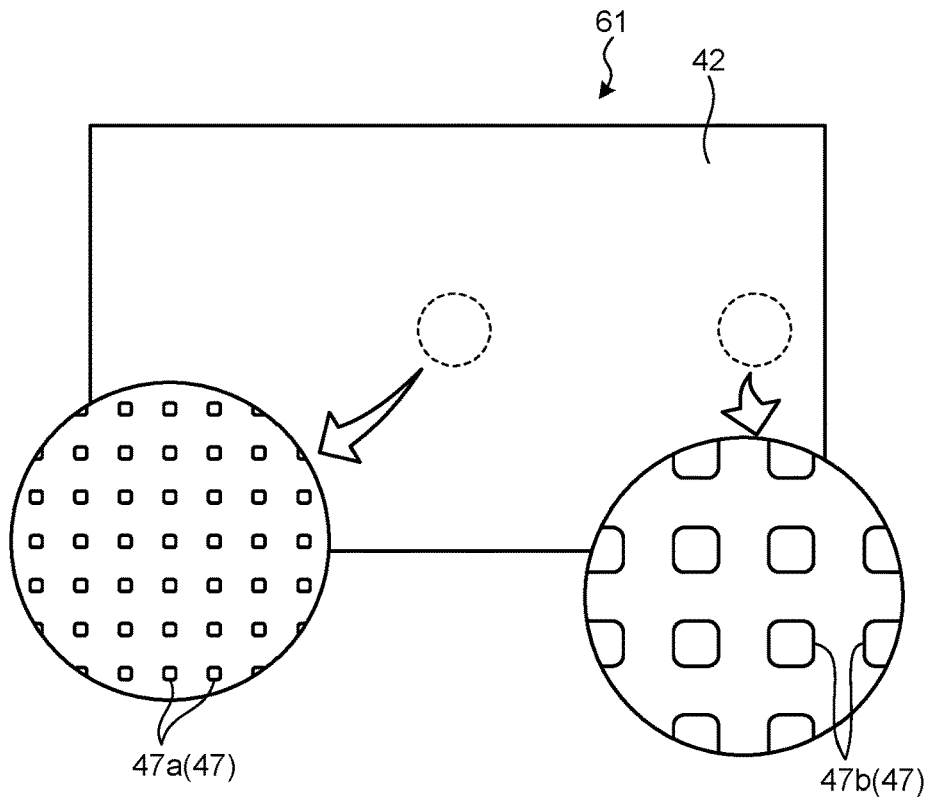
FIG. 8 is a plan view schematically illustrating a drone port according to a fifth embodiment.

Next, a drone port 61 of a fifth embodiment will be described with reference to FIG. 8. Note that, in the fifth embodiment, parts different from the first to fourth embodiments are described to avoid overlapping description, and constituents similar to those of the first to fourth embodiments are denoted by the same reference signs in the description. FIG. 8 is a plan view schematically illustrating the drone port according to the fifth embodiment.
Drone Port As illustrated in FIG. 8, in the drone port 61 of the fifth embodiment, the numerous through holes 47 formed in the port sheet 42 of the third embodiment have different sizes. In specific, in the numerous through holes 47, the size of through holes 47a in a central portion of the port sheet 42 is small, and the size of through holes 47b in a peripheral portion of the port sheet 42 is large. Note that the through holes 47 may be increased in size from the central portion toward the peripheral portion of the port sheet 42 in steps or continuously.

Even if downwash occurs when the drone 4 is landing, the port sheet 42 allows airflow to circulate through the numerous through holes 47 formed in the port sheet 42. In this case, the through holes 47, increased in size, in the peripheral portion of the port sheet 42 allow airflow going from the peripheral portion of the port sheet 42 to the underside of the port sheet 42 to readily circulate, and flapping at the peripheral portion of the port sheet 42 is suitably prevented.

Sixth Embodiment

Figure 9:
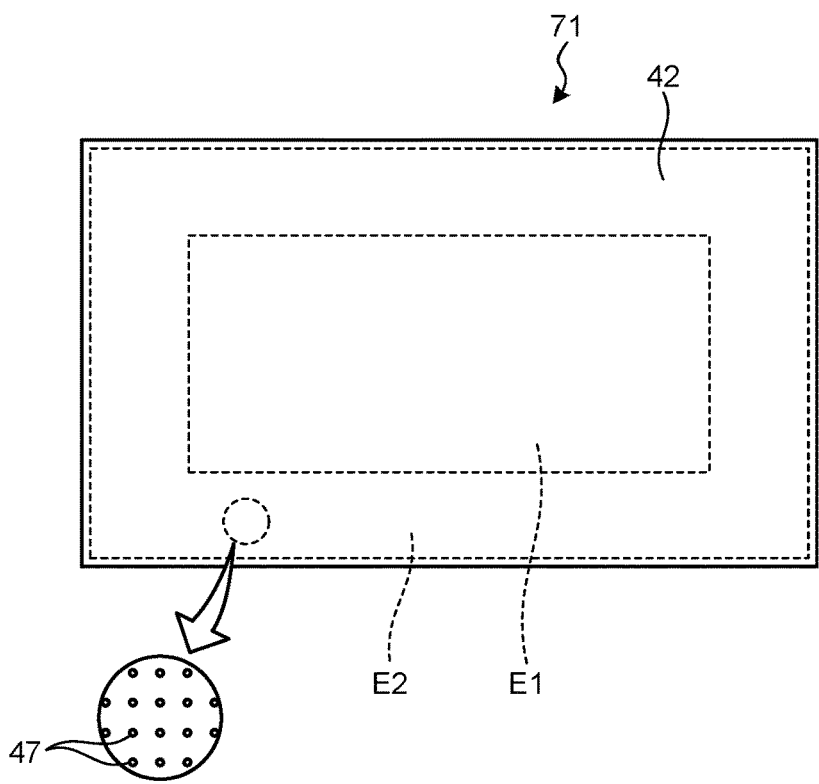
FIG. 9 is a plan view schematically illustrating a drone port according to a sixth embodiment.

Next, a drone port 71 of a sixth embodiment will be described with reference to FIG. 9. Note that, in the sixth embodiment, parts different from the first to fifth embodiments are described to avoid overlapping description, and constituents similar to those of the first to fifth embodiments are denoted by the same reference signs in the description. FIG. 9 is a plan view schematically illustrating the drone port according to the sixth embodiment.
Drone Port As illustrated in FIG. 9, in the drone port 71 of the sixth embodiment, the numerous through holes 47 formed in the port sheet 42 of the third embodiment are disposed only in a partial region. In specific, when the port sheet 42 is divided into a region E1 in a central portion of the port sheet 42 and a region E2 in a peripheral portion of the port sheet 42, the numerous through holes 47 are disposed in the region E2. That is, the numerous through holes 47 are disposed only in the peripheral portion of the port sheet 42.

Even if downwash occurs when the drone 4 is landing, the port sheet 42 allows airflow to circulate through the numerous through holes 47 formed in the port sheet 42. In this case, airflow readily goes from the peripheral portion of the port sheet 42 to the underside of the port sheet 42, so that the through holes 47 disposed in the peripheral portion of the port sheet 42 suitably prevent flapping at the peripheral portion of the port sheet 42.

As described above, the drone ports 1, 31, 41, 51, 61, and 71 described in the embodiments are understood, for example, as follows.

The drone port 1, 31, or 51 of a first aspect is the portable drone port 1, 31, or 51 that is portable to be disposed on the landing surface for the drone 4 and includes the covering section (port body 11, port sheet 42) configured to cover the landing surface and provided with the markers 7 of different sizes. The covering section includes the restraining section (hook-and-loop fastener 22, hook-and-loop fastener 52) configured to restrain, on the covering section, the drone 4 that lands on the covering section.

With this configuration, the drone 4 that lands on the covering section of the drone port 1, 31, or 51 can be restrained with the restraining section, which can prevent overturning of the drone 4 in landing.

As a second aspect, the drone 4 includes the contact surface configured to come into contact with the covering section when the drone 4 lands on the covering section, and the restraining section joins the top surface of the covering section to the contact surface through surface attachment.

With this configuration, when the drone 4 lands on the top surface of the covering section, the drone 4 can be readily restrained on the covering section through surface attachment by the restraining section. In addition, the contact area can be made large, so that the drone 4 can be properly restrained on the covering section.

As a third aspect, the restraining section is the hook-and-loop fastener 22 including the hook-and-loop fastener 22a or 22b on the one side disposed on the covering section.

With this configuration, the hook-and-loop fastener 22 can be applied as the restraining section, so that the drone 4 can be restrained on the covering section with a simple configuration.

As a fourth aspect, the hook-and-loop fastener 22a or 22b on the one side is disposed over the entire surface of the covering section and forms the markers 7.

With this configuration, while the markers 7 are properly formed, the drone 4 can be properly restrained in any position on the covering section.

As a fifth aspect, the covering section further includes the flat plate 21 disposed between the hook-and-loop fastener 22a or 22b on the one side and the landing surface and joined to the hook-and-loop fastener 22a or 22b on the one side.

With this configuration, the flat plate 21 can prevent flapping of the covering section, so that the drone 4 can suitably land on the covering section.

As a sixth aspect, the flat plate 21 includes the grooves 32 configured to serve as drainage channels.

With this configuration, even if water, such as rain and sea water, falls on the covering section, the falling water can be suitably drained from the covering section through the grooves 32.

As a seventh aspect, the covering section includes the covering pieces (port pieces 13) divided and the coupling member 14 coupling the covering pieces.

With this configuration, the covering section can be divided into the covering pieces and conveyed, which can further enhance portability.

As an eighth aspect, the markers 7 include the small markers 72 and the large markers 74 larger than the small markers 72, the small markers 72 are each disposed on a single covering piece, and the large markers 74 are formed by a plurality of the covering pieces.

With this configuration, the small markers 72 are not divided, which can prevent recognition of the small markers 72 from being affected. Furthermore, the large markers 74 are formed by the covering pieces, which can enhance portability of the covering section corresponding to the large markers 74.

As a ninth aspect, the numerous through holes 47 are formed in the covering section.

With this configuration, even if downwash occurs when the drone 4 is landing, airflow is circulated through the numerous through holes 47, which can prevent flapping of the covering section.

The drone port 41, 51, 61, or 71 of a tenth aspect is the portable drone port 41, 51, 61, or 71 that is portable to be disposed on the landing surface for the drone 4 and includes the port sheet 42 formed into a sheet configured to covering the landing surface and provided with the markers 7 of different sizes, and the numerous through holes 47 formed in the port sheet 42.

With this configuration, even if downwash occurs when the drone 4 is landing, airflow is circulated through the numerous through holes 47, which can prevent flapping of the port sheet 42.

As an eleventh aspect, the weights configured to be disposed in the peripheral portion of the port sheet 42 and the accommodating sections 44 disposed on the port sheet 42 and configured to accommodate the weights 43 are further included.

With this configuration, even if downwash occurs when the drone 4 is landing, the weights 43 can prevent flapping of the port sheet 42.

As a twelfth aspect, the buffer sheet 45 disposed between the port sheet 42 and the landing surface and configured to absorb impact caused by landing of the drone 4 is further included.

With this configuration, the buffer sheet 45 can absorb impact caused by landing of the drone 4.

As a thirteenth aspect, the port sheet is made of tarpaulin.

With this configuration, the port sheet can be formed of an inexpensive material having waterproofness.

As a fourteenth aspect, in the numerous through holes 47, the size of the holes in the central portion of the port sheet 42 is small, and the size of the holes in the peripheral portion of the port sheet 42 is large.

With this configuration, even if downwash occurs when the drone 4 is landing, flapping at the peripheral portion of the port sheet 42 can be suitably prevented.

As a fifteenth aspect, the numerous through holes 47 are disposed only in the peripheral portion of the port sheet 42.

With this configuration, even if downwash occurs when the drone 4 is landing, flapping at the peripheral portion of the port sheet 42 can be suitably prevented.

REFERENCE SIGNS LIST

1 Drone port (first embodiment)
4 Drone
5 Vessel
7 Marker
11 Port body
13 Port piece
14 Coupling member
17 Through hole
21 Flat plate
22, 22a, 22b Hook-and-loop fastener
25 Receiving plate
31 Drone port (second embodiment)
32 Groove
41 Drone port (third embodiment)
42 Port sheet
43 Weight
44 Accommodating section
45 Buffer sheet
47 Through hole
51 Drone port (fourth embodiment)
52 Hook-and-loop fastener
61 Drone port (fifth embodiment)
71 Drone port (sixth embodiment)
72 Small marker
74 Large marker

The invention claimed is:

1. A drone port that is portable to be disposed on a landing surface for a drone, the drone port comprising:
    a covering section configured to cover the landing surface and provided with a first marker and a second marker,
    wherein the covering section includes:
    a restraining section configured to restrain the drone on the covering section;
    covering pieces that are divided; and
    a coupling member which couples at least two of the covering pieces,
    wherein:
    the second marker is larger than the first marker;
    the first marker is disposed on a single one of the covering pieces; and
    the second marker is defined by at least two of the covering pieces.

2. The drone port according to claim 1, wherein the restraining section is configured to join a top surface of the covering section to a contact surface of the drone through surface attachment.

3. The drone port according to claim 1, wherein through holes are defined in the covering section.

4. The drone port according to claim 1, wherein the restraining section includes at least one hook-and-loop fastener disposed on the covering section.

5. The drone port according to claim 4, wherein the at least one hook-and-loop fastener is disposed over an entire surface of the covering section and defines the first marker and the second marker.

6. The drone port according to claim 4, wherein the covering section further includes a flat plate joined to the at least one hook-and-loop fastener and configured to be disposed between the at least one hook-and-loop fastener and the landing surface.

7. The drone port according to claim 6, wherein the flat plate includes a groove configured to serve as a drainage channel.

8. A drone port that is portable to be disposed on a landing surface for a drone, the drone port comprising:
    a port sheet configured to cover the landing surface and provided with markers of different sizes; and
    through holes defined in the port sheet to suppress flapping of the port sheet,
    wherein respective sizes of the through holes are configured to allow a landing position to be captured by image processing of the markers.

9. The drone port according to claim 8, further comprising:
    a weight disposed in a peripheral portion of the port sheet; and
    an accommodating section disposed on the port sheet to accommodate the weight.

10. The drone port according to claim 8, further comprising a buffer sheet configured to be disposed between the port sheet and the landing surface to absorb impact caused by landing of the drone.

11. The drone port according to claim 8, wherein the port sheet is made of tarpaulin.

12. The drone port according to claim 8, wherein respective sizes of the through holes in a central portion of the port sheet are smaller than respective sizes of the through holes in a peripheral portion of the port sheet.

13. The drone port according to claim 8, wherein the through holes are defined only in a peripheral portion of the port sheet.

* * * * *